(12) United States Patent
Edpalm et al.

(10) Patent No.: US 11,102,508 B2
(45) Date of Patent: Aug. 24, 2021

(54) METHOD AND IMAGE PROCESSING UNIT FOR FORMING A VIDEO STREAM

(71) Applicant: Axis AB, Lund (SE)

(72) Inventors: Viktor Edpalm, Lund (SE); Björn Ardö, Lund (SE)

(73) Assignee: Axis AB, Lund (SE)

( * ) Notice: Subject to any disclaimer, the term of this patent is extended or adjusted under 35 U.S.C. 154(b) by 25 days.

(21) Appl. No.: 15/961,426

(22) Filed: Apr. 24, 2018

(65) Prior Publication Data

US 2018/0310022 A1    Oct. 25, 2018

(30) Foreign Application Priority Data

Apr. 25, 2017    (EP) .................................... 17167949

(51) Int. Cl.
*H04N 19/176*    (2014.01)
*H04N 19/58*    (2014.01)
(Continued)

(52) U.S. Cl.
CPC ........... *H04N 19/58* (2014.11); *H04N 19/105* (2014.11); *H04N 19/132* (2014.11);
(Continued)

(58) Field of Classification Search
CPC .... H04N 19/176; H04N 19/58; H04N 19/105; H04N 19/139; H04N 19/59;
(Continued)

(56) References Cited

U.S. PATENT DOCUMENTS 6,020,931 A * 2/2000 Bilbrey .................. H04N 5/222
                                                           348/584
6,731,813 B1    5/2004 Stewart
(Continued)

OTHER PUBLICATIONS

Yuwen He et al. ("Variable Frame-Rate Video Coding Based on Global Motion Analysis", In: "Lecture Notes in Computer Science", Jan. 1, 2001) (Year: 2001).*
(Continued)

*Primary Examiner* — Alison Slater
*Assistant Examiner* — Berteau Joisil
(74) *Attorney, Agent, or Firm* — Volpe Koenig

(57) ABSTRACT

A method and an apparatus for forming a video stream based on images of a scene captured by a camera. The method comprises: encoding image frames based on images captured by the camera, forming an encoded portion; determining a length of motion for a sample image frame, the length of motion being indicative of the amount of relative motion between the camera and the scene in the sample image frame relative a temporally preceding image frame; setting a motion length threshold based on a motion vector search range of the encoder; comparing the determined length of motion with the set motion length threshold; based on the outcome of the comparison, adjusting a chosen temporal frame distance of at least an adjustment portion ($P_A$) of the video stream, wherein the adjustment portion is comprised in the encoded portion or in a temporally later encoded portion.

12 Claims, 7 Drawing Sheets

(51) Int. Cl.
H04N 19/139 (2014.01)
H04N 19/105 (2014.01)
H04N 19/59 (2014.01)
H04N 19/132 (2014.01)
H04N 19/177 (2014.01)
H04N 19/527 (2014.01)
H04N 19/172 (2014.01)

(52) U.S. Cl.
CPC ......... H04N 19/139 (2014.11); H04N 19/176 (2014.11); H04N 19/177 (2014.11); H04N 19/527 (2014.11); H04N 19/59 (2014.11); H04N 19/172 (2014.11)

(58) Field of Classification Search
CPC .. H04N 19/132; H04N 19/177; H04N 19/527; H04N 19/172
See application file for complete search history.

(56) References Cited

U.S. PATENT DOCUMENTS 8,204,355 B2  6/2012  Saito et al.
8,319,859 B2  11/2012  Kim et al.
2008/0232468 A1  9/2008  Kwon et al.
2009/0238409 A1*  9/2009  Hahn ..................... G06T 7/223
                                                    382/103
2010/0061461 A1*  3/2010  Bankoski ............ H04N 19/105
                                                    375/240.16

OTHER PUBLICATIONS

Yuwen He et al. ("Variable Frame-Rate Video Coding Based on Global Motion Analysis", In: "Lecture Notes in Computer Science", 1 Jan. 2001) (Year: 2001).*
Chen et al., "SaVE: Sensor-assisted Motion Estimation for Efficient H.264/AVC Video Encoding," Proceedings of the 17th ACM international conference on Multimedia, pp. 381-390 (Oct. 19-24, 2009).
European Search Report, EP Application No. 17167949.1, dated Nov. 7, 2017.
He et al., "Variable Frame-Rate Video Coding Based on Global Motion Analysis," Advances in Multimedia Information Processing—PCM 2001, pp. 426-433 (2001).
Ma et al., "Adaptive GOP structure based on motion coherence," Proceedings of SPIE, Satellite Data Compression, Communication, and Processing, vol. 7455 (Aug. 31, 2009).
AXIS Communications, "Reducing the bit rate with Axis Zipstream," available at: https://www.axis.com/en-us/learning/web-articles/reducing-the-bit-rate-with-axis-zipstream (Apr. 24, 2018).

* cited by examiner

METHOD AND IMAGE PROCESSING UNIT FOR FORMING A VIDEO STREAM

FIELD OF INVENTION

The present teachings relate to the field of video encoding, and more particularly to how a video stream is formed for encoding.

BACKGROUND

In digital video systems, such as network camera monitoring systems, video sequences are compressed before transmission and/or storage using various video encoding methods. In many digital video encoding systems, two main modes are used for compressing video frames of a sequence of video frames: intra mode and inter mode. In the intra mode, the luminance and chrominance channels are encoded by exploiting the spatial redundancy of the pixels in a given channel of a single frame via prediction, transform, and entropy coding. The encoded frames are called intra-frames, and may also be referred to as I-frames. Within an intra-frame, blocks of pixels, also referred to as macroblocks, coding units or coding tree units, are encoded in intra-mode, meaning that they are encoded with reference to a similar block within the same image frame, or raw coded with no reference at all. The inter mode instead exploits the temporal redundancy between separate frames, and relies on a motion-compensation prediction technique that predicts parts of a frame from one or more previous frames by encoding the motion in pixels from one frame to another for selected blocks of pixels. The encoded frames are called inter-frames, and may be referred to as P-frames (forward-predicted frames), which can refer to previous frames in decoding order, or B-frames (bi-directionally predicted frames), which can refer to two or more previously decoded frames, and can have any arbitrary display-order relationship of the frames used for the prediction. Within an inter-frame, blocks of pixels may be encoded either in inter-mode, meaning that they are encoded with reference to a similar block in a previously decoded image, or in intra-mode, meaning that they are encoded with reference to a similar block within the same image frame, or raw-coded with no reference at all.

Inter-frames generally require less bits for representing an image than intra-frames. Similarly, inter-coded blocks of an inter-frame require less bits than intra-coded blocks. In an interest of saving storage space and transmission bandwidth it is therefore beneficial to use inter-frames, and to use few intra-coded blocks in the inter-frames.

When a block of pixels is to be inter-coded, a search is made for a sufficiently similar block of pixels in a reference frame. As already mentioned, the reference frame is a previously encoded and decoded image frame. For a block in the reference frame to be considered similar enough to the block to be encoded in the current image to be used as reference block, the difference between the block in the current image frame and the potential block in the reference frame has to be below a predetermined similarity threshold. The difference may, e.g., be expressed as a sum of absolute differences, SAD. The SAD is calculated by taking the absolute difference between a pixel in the current image frame and a corresponding pixel in a compared block in the reference frame and calculating a sum of all such differences for all pixels in the block. Thus, the SAD may be expressed as follows:

$$SAD = \Sum_{(n=1)}^{N} |V_{(c,n)} - V_{(r,n)}|.$$

Here, N is the number of pixels in the studied block, Vc,n is the pixel value of pixel n in the current image frame, and Vr,n is the pixel value of the corresponding pixel n in the reference frame.

If the block where the search is started is considered similar to the block to be encoded, this first block is used as reference block, and a motion vector is calculated, describing how much the block to encode is displaced in the image frame compared to the reference block in the reference frame.

If, on the other hand, the block where the search is started differs too much from the block to be encoded, i.e. if the SAD is above the predetermined threshold, the search continues to another block. Which block to continue to is determined by a search pattern used for the search. There are many possible search patterns, such as a spiral pattern search, three step search, four step search, exhaustive search, binary search, diamond search, two-dimensional logarithmic search, orthogonal search, one at a time search, cross search, adaptive rood pattern search, hierarchical search or spatially dependent search. Variants of spiral search patterns may be used, such as a golden spiral pattern or a Fibonacci spiral pattern. As soon as a similar block is found, the search is discontinued, and the similar block is used as reference block. Generally, the encoder has a limit to how long the search may continue, as it may otherwise take too long time to perform the search for encoding to be performed in real time. The maximum length of the search may be set, e.g., as a number of rows or columns of blocks. If the maximum length of the search is reached without finding a similar block, the block in the current image frame is encoded as an intra-coded block, i.e. an I-block, since this will generally be more bit efficient than encoding it as a P-block with a large residual, i.e. using a less similar block as reference block. Searching and encoding is repeated in this manner for all blocks in the current image.

When there is a lot of apparent movement in the captured scene, be it because there is actual movement in the scene, because there are lighting changes in the scene, or because the camera is moving relative to the scene in a panning or tilting movement, a zoom operation, or in a shaking movement, the probability of encoding I-blocks in inter-frames increases, since the movement that occurs from one frame to the next will often be larger than the longest motion vector fitting within the maximum length of the search. This means that there may very well be a sufficiently similar block in the reference frame, but it is outside the maximum search range. Many blocks will therefore need to be intra-coded. This leads to bigger image files, requiring more bandwidth and storage capacity. It would be desirable to be able to reduce the number of bits required for representing image frames, without unnecessarily sacrificing image quality, also when the camera capturing the image frames is moving and when there is a lot of movement or changes in the captured scene.

SUMMARY

An aim of the present disclosure is to provide a method that makes it possible to encode image frames in a video stream with efficient bitrate usage when there is a lot of apparent movement in the scene.

It is also an aim of the present disclosure to provide an image processing unit enabling efficient encoding of a video stream.

According to a first aspect, these and other objects are achieved, in full or at least in part, by a method for forming a video stream based on images of a scene captured by a camera, the method comprising: encoding, by an encoder, image frames based on images captured by the camera, forming an encoded portion of the video stream; determining a length of motion for a sample image frame, being one of the encoded image frames in the encoded portion, the length of motion being indicative of the amount of relative motion between the camera and the scene in the sample image frame relative a temporally preceding image frame; setting a motion length threshold based on a motion vector search range of the encoder; comparing the determined length of motion with the set motion length threshold; based on the outcome of the comparison, adjusting a chosen temporal frame distance of at least an adjustment portion of the video stream, wherein the adjustment portion is comprised in the encoded portion or in a temporally later encoded portion. Such a method makes it possible to adapt encoding when there is motion in the scene or when the camera capturing the scene is moving. This makes it possible to make bitrate savings.

As used herein "relative motion between the camera and the scene" means motion in the scene as well as movement of the camera. Motion in the scene may in turn be caused by objects actually moving in the scene, but may also be caused by light changes. Movement of the camera may be panning, tilting or rolling movement of the camera, as well as zooming operations. Movement of the camera may also be caused by shaking if the camera is not perfectly fixed.

The act of adjusting the chosen temporal frame distance may comprise, upon the determined length of motion being above the set motion length threshold, de-creasing the chosen temporal frame distance of the adjustment portion by encoding N≥1 additional image frame or image frames, wherein the one or more additional image frames are located in between successive image frames of the adjustment portion. By encoding additional image frames, the likelihood that pixel blocks may be encoded as P-blocks increases, as the movement of any block is spread over more image frames.

The one or more additional image frames may be located between the sample image frame and a preceding image frame.

In some variants of the method, the one or more additional image frames are inter frame encoded with motion vectors and without residuals. Hereby, bitrate may be further reduced, as the residuals are not encoded.

The one or more additional image frames may be associated with a non-display marker indicating that the one or more additional image frames are not to be displayed by a receiver of the video stream. In this manner, frame rate at the receiving end may be maintained. This may be necessary if the recipient of the encoded video stream, e.g., a video management system, is not capable of varying dis-played frame rate.

In some variants of the method, the act of adjusting the chosen frame rate comprises, upon the determined length of motion being below the set motion length threshold, increasing the chosen temporal frame distance of the adjustment portion by removing an encoded image frame of the video stream. Hereby, bitrate may be saved when there is little or no motion.

The motion length threshold may be set to be the longest length of motion for a block of pixels that can be detected within the motion vector search range. In this manner, frame rate may be adjusted when motion is too large to be encoded with inter-coding considering the motion vector search range.

The method may further comprise comparing the determined length of motion with an upper motion length threshold; and adjusting the chosen temporal frame distance on a condition that the determined length of motion is below the upper motion length threshold. Hereby, adjustment of the temporal frame distance, or in other words the frame rate, may be avoided when motion is too large to be compensated for by encoding additional image frames.

The act of determining a length of motion of the sample image frame in the encoded portion may comprise comparing the sample image frame with a temporally preceding image frame.

In some variants, the method further comprises, before the act of comparing, scaling down the sample image frame and the preceding image frame. Hereby, longer motion vectors may be found within the same motion vector search range.

The method may further comprise receiving data indicative of a motion of the camera; wherein the act of determining a length of motion of the sample image frame is based on the received data. The data indicative of motion may be received from a motion sensor or a pan-tilt-zoom, PTZ, control unit of the camera.

According to a second aspect, these and other objects are achieved, in full or at least in part, by a computer program product comprising a non-transitory computer-readable storage medium with instructions adapted to carry out the method of the first aspect when executed by a device having processing capability.

According to a third aspect, these and other objects are achieved, in full or at least in part, by an image processing unit configured to form a video stream, the image processing unit comprising: a receiver arranged to: receive images of a scene captured by an image sensor; an encoder configured to: encode image frames, based on the received images, for forming an encoded portion of the video stream; and a frame rate controller configured to: determine a length of motion of a sample image frame, being one of the encoded image frames in the encoded portion, the length of motion being indicative of the amount of relative motion between the camera and the scene in the sample image frame relative a temporally preceding image frame; set a motion length threshold based on a motion vector search range of the encoder; compare the determined length of motion with the set motion length threshold; and based on the outcome of the comparison, adjust a chosen temporal frame distance of at least an adjustment portion of the video stream, wherein the adjustment portion is comprised in the encoded portion or in a temporally later encoded portion.

The image processing unit of the third aspect may generally be embodied in the same ways as the method of the first aspect with accompanying advantages.

According to a fourth aspect, these and other objects are achieved, in full or at least in part, by a camera comprising an image processing unit according to the third aspect.

A further scope of applicability of the present teachings will become apparent from the detailed description given below. However, it should be understood that the detailed description and specific examples, while indicating embodiments of the teachings, are given by way of illustration only, since various changes and modifications within the scope of the present teachings will become apparent to those skilled in the art from this detailed description.

Hence, it is to be understood that the present teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

A more detailed understanding may be had from the following description, given by way of example in conjunction with the accompanying drawings where.

DETAILED DESCRIPTION

Figure 1:
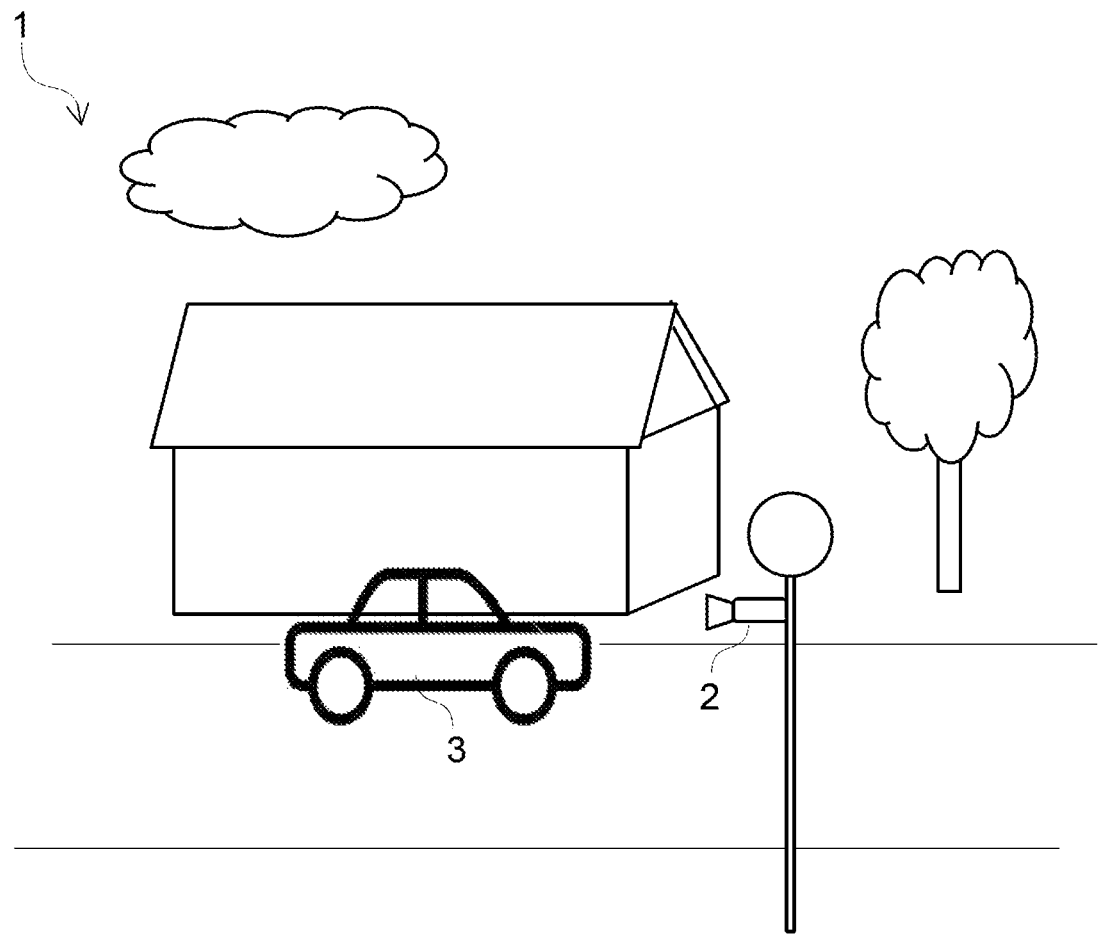
FIG. 1 is a perspective view of a scene monitored by a camera.
Figure 2A:
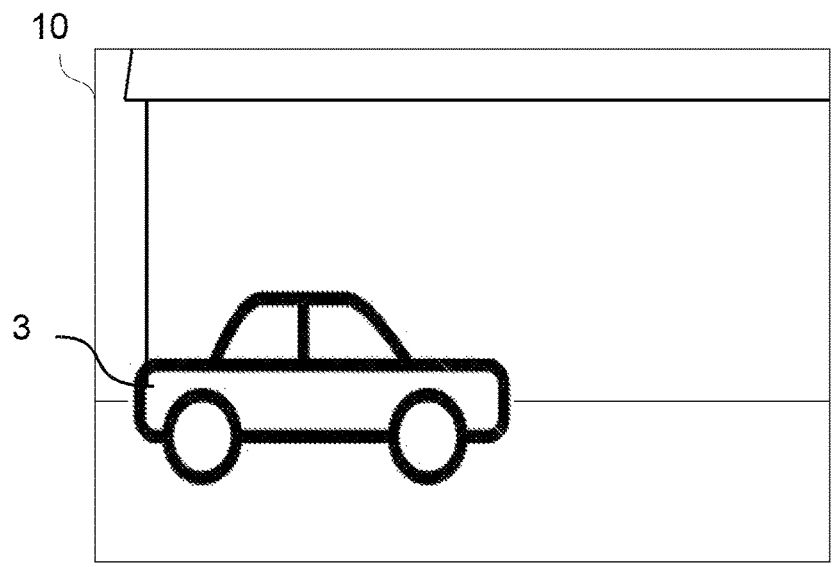
FIG. 2a is an illustration of an image of the scene of FIG. 1 captured by the camera.
Figure 2B:
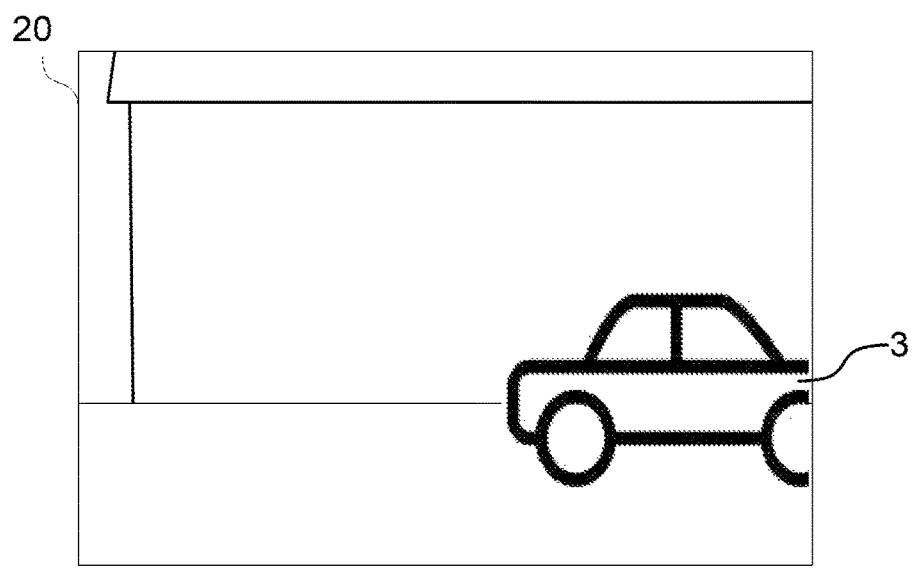
FIG. 2b is an illustration of another image of the scene of FIG. 1 captured by the camera.

In FIG. 1, a scene 1 is shown, which is monitored by a camera 2. In the scene 1, a car 3 may be seen. The camera 2 is a video camera capturing a sequence of images of the scene 1. FIG. 2a shows a first image 10 captured of the scene 1 at a first point in time. Here, the car 3 appears to the left in the image 10. FIG. 2b shows a second image 20 captured at a second point in time, which is later. The car 3 has now driven a distance to the right, therefore appearing to the right in the image 20.

Figure 3:
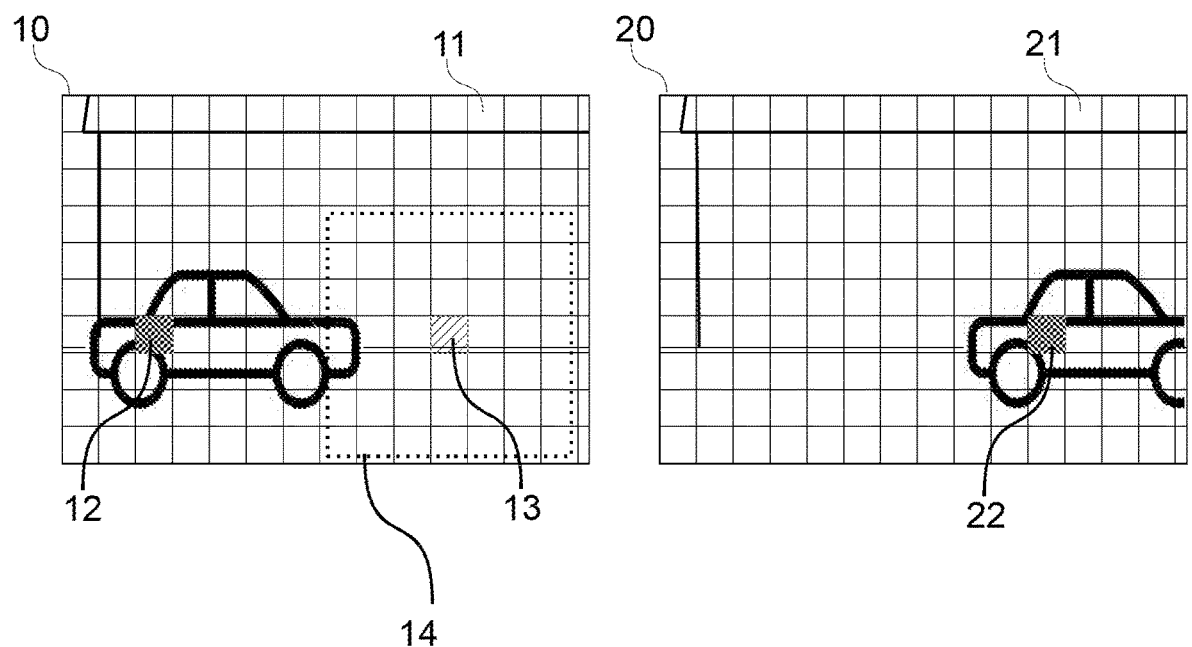
FIG. 3 shows the images of FIGS. 2a and 2b divided into blocks of pixels for encoding.

FIG. 3 shows the two images 10, 20 schematically divided into blocks 11, 21 of pixels for encoding. Each image may, for instance, be made up of 1920×1080 pixels, and the pixels may be grouped into blocks of, e.g., 64×64 pixels, yielding 30×17 blocks. For the sake of clarity of the drawing, however, only a reduced number of blocks are shown in FIG. 3.

When the second image 20 is to be encoded, an encoded and decoded version of the first image 10 is used as reference frame and inter-coding is used. For each pixel block 21 in the second image 20, a search is made for a sufficiently similar block in the first image 10. As an example, a block 22, marked by a chequered pattern, which represents part of the car close to the rear wheel will be studied. A corresponding block 12 representing essentially the same part of the car is marked in the first image 10. When a search is made for a sufficiently similar block to use as reference block, the search starts in a position in the first image 10 that corresponds to the position of the block 22 that is to be encoded in the second image 20. In the second image, a block 13 at the position corresponding to the block 22 to be encoded is marked by hatching. The search starts in the correspondingly positioned block 13 and follows, e.g., a spiral pattern out from the start block 13. It may be noted that, in the interest of simplicity, the same grouping of pixels into blocks is shown in the first image 10 as in the second image 20. However, the search need not be limited to an identical grouping, but may be made on sub pixel level. In this simplified example, the search is limited to a search area 14 that is seven blocks in height and seven blocks in width, marked in FIG. 3 with a dotted line. It may be seen that in this way the search will not reach the similar block 12. The block 22 to encode will therefore have to be encoded using intra-coding, i.e. as an I-block. As already discussed in the background section, inter-frames with many I-blocks generally require more bits than inter-frames with fewer I-blocks. Thus, output bitrate from the encoder encoding the video sequence containing the first and second images 10, 20 will likely be unnecessarily high.

According to the present teachings, this problem may be solved by increasing a frame rate at which image frames are encoded. This may seem counterintuitive, as more image frames would be expected to require more bits for encoding than a smaller number of image frames. However, the present teachings recite that by increasing the frame rate at which image frames are encoded, the distance an object will have moved between two successive frames will be shorter than if a lower frame rate is used. Thereby, the ratio of P-blocks may be increased, allowing a decrease in bitrate which may exceed the increase in bitrate that is caused by the increased bitrate. The frame rate, expressed in frames per second or fps, may also be considered in terms of temporal frame distance, expressed in seconds. For instance, if image frames are encoded at a rate of 30 fps, the temporal distance between successive frames is ⅟30 second. Thus, frame rate and temporal frame distance are two parameters controlling the same thing, namely how often image frames are encoded.

Figure 4:
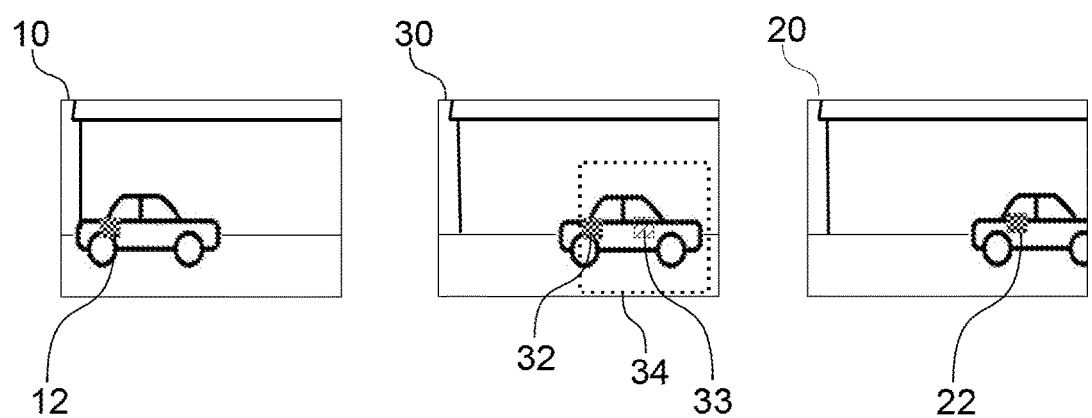
FIG. 4 shows the images of FIG. 3 and an additional image.

With the car in the images 10, 20 as an example, it may be understood that if a doubled frame rate were used, there would be an additional image between the first image 10 and the second image 20. In such an additional image, captured halfway between the capture time of the first image 10 and the capture time of the second image 20, assuming that the car moves at a speed which is reasonably constant compared to the capture frame rate, the car would have moved only half as far from the first image frame 10 to the additional image frame, as it has done from the first image frame 10 to the second image frame 20. This is illustrated in FIG. 4, where an additional image 30 has been added between the first 10 and second 20 images. In order not to clutter the drawing, the block boundaries are not shown in FIG. 4, except for the block 22 to be encoded and the blocks in the other images that are needed for the explanation of the present teachings.

When the block 22 marked in the second image 20 is to be encoded, an encoded and decoded version of the additional image 30 is used as reference frame. Here, it may be seen that the part of the car represented by the block 22 has not moved as far from the time of capture of the additional image 30 to the time of capture of the second image 20 as it had between the captures of the first 10 and second 20 images. A search is made for a sufficiently similar block in the additional image 30, starting at a correspondingly positioned block 33. With the same limit for the motion vector search area 34 as before, a similar block 32 representing the same part of the car as the block 22 to be encoded is actually found within the search area 34. The block 22 to be encoded can therefore be encoded with inter-coding, as a P-block, with reference to the similar block 32, a motion vector indicating how much the current block 22 is displaced compared to the reference block 32, and a residual indicating how much the pixel values of the current block 22 differ from the pixel values of the reference block 32. Since P-blocks generally require fewer bits for encoding than I-blocks, output bitrate from the encoder may be reduced, even though the number of frames encoded is increased.

Figure 5:
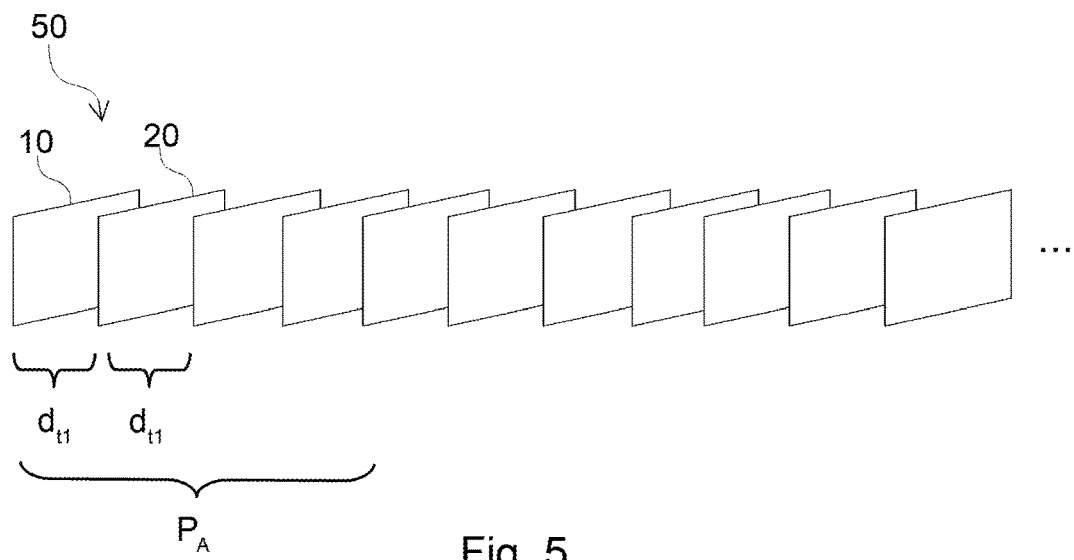
FIG. 5 is an illustration of a sequence of encoded image frames.

In FIG. 5, an example of a video sequence or video stream 50 of encoded image frames is shown. In this example, the video sequence 50 starts with the first image frame 10 followed by the second image frame 20, which is in turn followed by a sequence of image frames. The video stream 50 is encoded at a first frame rate, which in FIG. 5 is illustrated by a first temporal frame distance dt1.

As described above, there is too much movement between the first image 10 frame and the second image frame 20 for encoding all blocks as P-blocks. Depending on how many blocks would need to be encoded as I-blocks, it may be worthwhile to introduce the additional image frame 30 between the first and second image frames. If only a few blocks would need to be encoded as I-blocks, e.g., if a small object is moving fast in the scene, the bitrate added by the additional image may be higher than the bitrate added by the I-blocks, such that it would not be beneficial to introduce the additional image frame 30. However, if many blocks would need to be encoded as I-blocks, e.g., if a large object is moving fast in the scene or if the camera is moving, the bitrate added by the additional image frame may be smaller than the bitrate added by the I-blocks, such that bits may in total be saved.

Ways of determining when to increase frame rate, or in other words decrease temporal frame distance, will now be described. In FIG. 5 a first portion of the video stream, which will be referred to as an adjustment portion PA, is marked. The adjustment portion PA is constituted by a portion of the first video stream, i.e. a number of successive image frames. The second image frame 20 will here be used as a sample image frame. A length of motion is determined for the sample image frame 20. The length of motion is representative of the amount of relative motion between the camera and the scene between a temporally preceding image frame, in this case the first image frame 10, and the sample image frame 20. It should be noted that the relative motion may have many sources. The relative motion between the camera and the scene could be caused by movement of one or more objects in the scene. Light changes in the scene may also appear as motion. Further, if the camera is moving in a panning and/or tilting motion, this will appear as motion in the captured images. Similarly, if the camera is zooming in or out, this will appear as motion. Additionally, if the camera is moving unintentionally, in a shaking movement, this will also appear as motion in the captured images.

Figure 6:
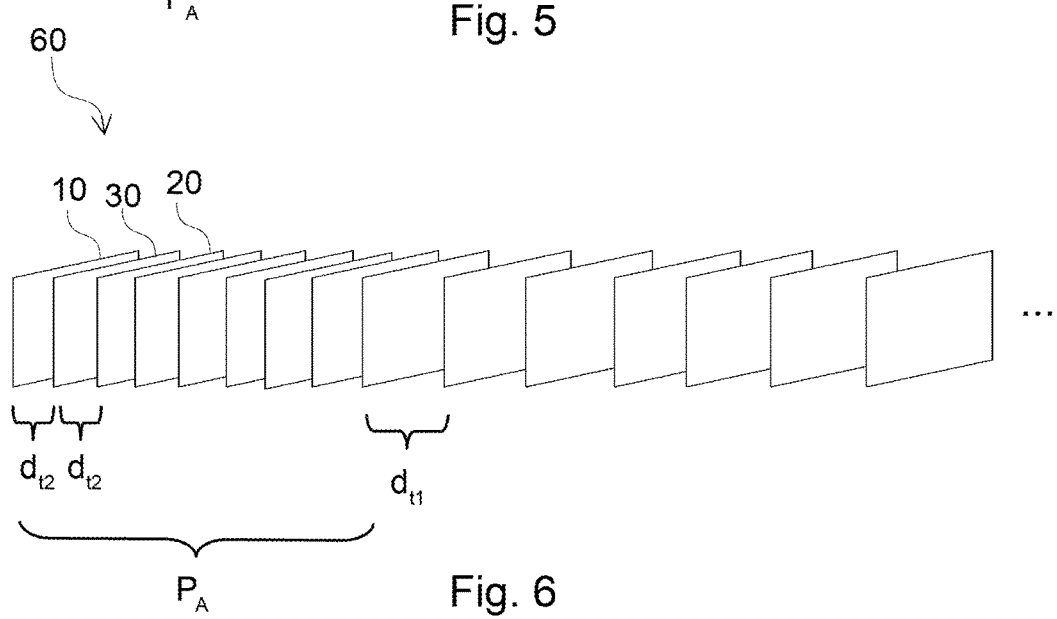
FIG. 6 is an illustration of a sequence of encoded image frames where a frame rate has been adjusted in accordance with an embodiment.
Figure 8A:
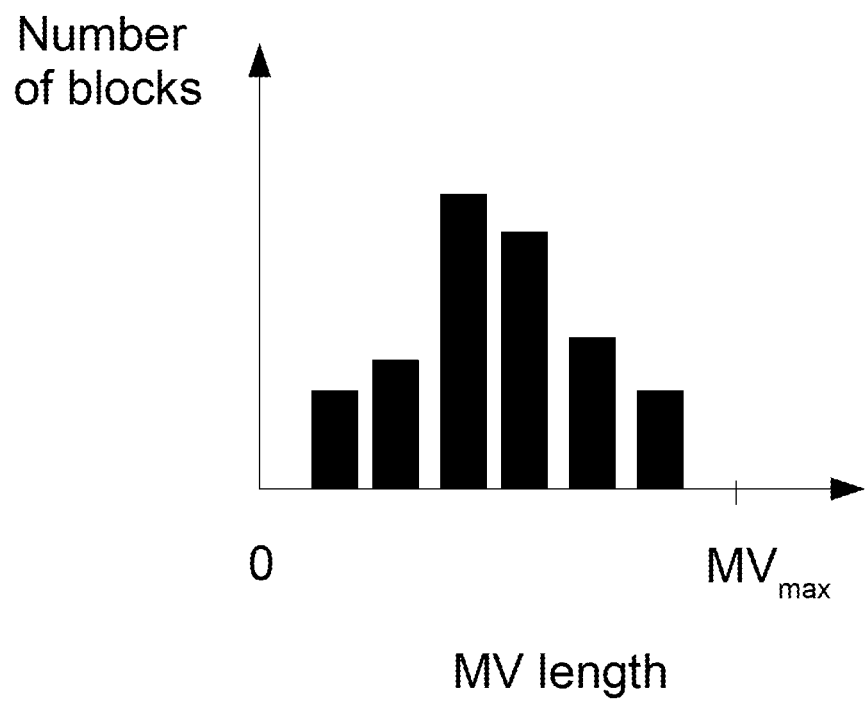
FIGS. 8a and 8b show examples of histograms of motion vectors.
Figure 8B:
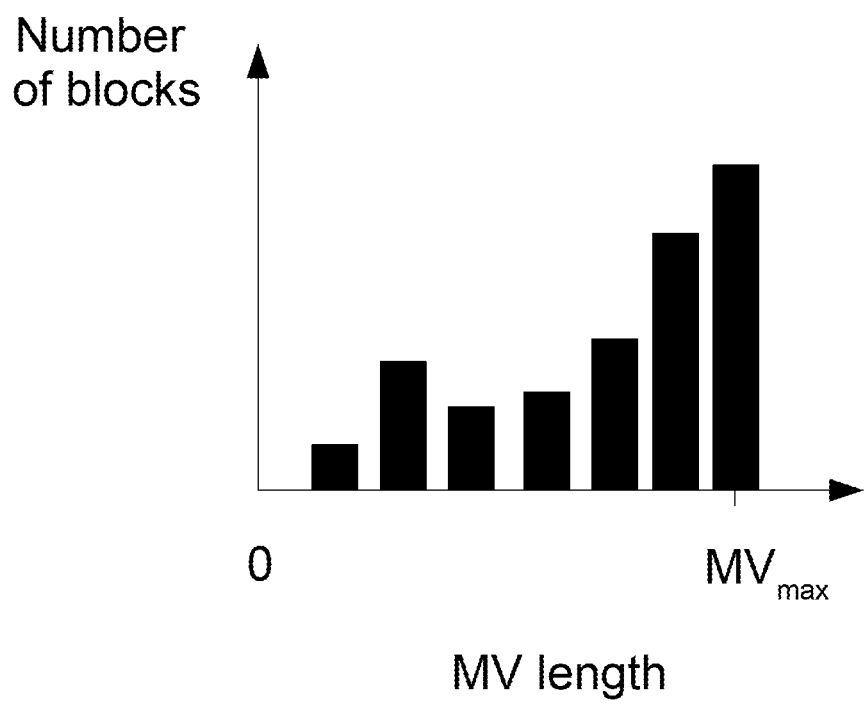

One way of determining if additional images should be added, such that the temporal frame distance is decreased, is to study the motion vectors calculated when encoding the second image 20. If many of them are long, such that they are at or close to the maximum length limited by the motion search area, this may indicate that there is a lot of fast movement. A histogram may be made, where motion vectors of different lengths are sorted into bins. Examples of such a histogram are shown in FIG. 8. Each bin represents a motion vector length. The histogram may be studied to see if there is any peak, implying that there are many blocks in the image frame being encoded with a particular length of motion vector. As the limit of the motion vector search range in the example illustrated in FIG. 3 is a seven blocks wide and seven blocks high area, the longest motion vector that can be encoded is three blocks long in a horizontal direction and three blocks long in a vertical direction. Therefore, a motion length threshold is set at three blocks. FIG. 8a shows a histogram representing an image frame in which most motion vectors have a length of about half the maximum motion vector length MVmax. It should be noted that the histograms shown in FIGS. 8a and 8b are purely illustrative, and that the maximum motion vector length MVmax shown there is not necessarily three blocks. If many blocks in the second image frame 20 have been encoded with motion vectors of three blocks in length in any direction, as indicated in FIG. 8b, it may be suspected that there were also blocks that could have been encoded with slightly longer motion vectors, had the encoder been capable of, or allowed to, search in a larger area. By inserting the additional image 30, as in FIG. 6, a better chance of encoding pixel blocks in the second image frame 20 as P-blocks is achieved. Similarly, an additional image is inserted between each pair of successive image frames in the adjustment portion PA, such that the frame rate is doubled and the temporal frame distance is halved from the first temporal frame distance dt1 of the first video sequence 50 to the second temporal frame distance dt2 of the second video sequence 60. After the adjustment portion PA, the frame rate may return to the original frame rate, such that the temporal frame distance returns to the first temporal frame distance dt1.

Figure 7:
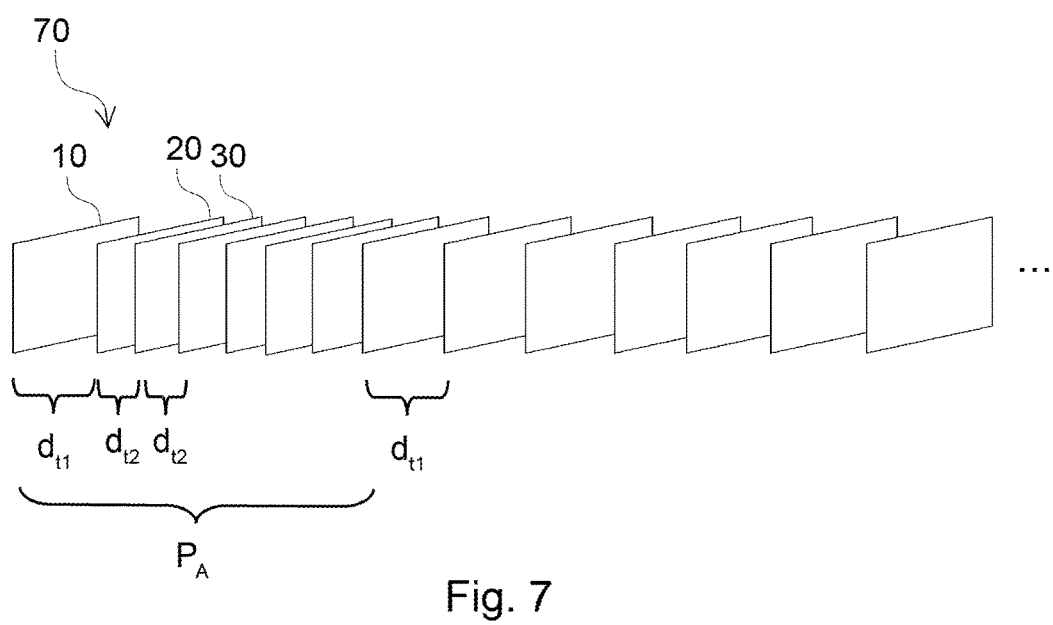
FIG. 7 is an illustration of a sequence of encoded image frames where a frame rate has been adjusted in accordance with another embodiment.

It may be noted that if encoding is done in real time, it may not be possible to add the additional image frame 30 before the sample image frame 20. Instead, addition of additional image frames may start after the sample image frame. This is illustrated in FIG. 7, which shows a video stream 70 in which frame rate is increased after the sample image frame 20 by addition of the additional image frame 30.

Different approaches may be made to the decision of when to increase frame rate, i.e. decrease temporal frame distance. In each of these approaches a length of motion indicative of the amount of relative motion between the camera and the scene is taken into account. The length of motion may be determined as the longest motion vector encoded in the sample image frame, such that as soon as any block is encoded with a motion vector that is of the maximum length fitting within the motion vector search range, frame rate is increased. In this way, frame rate will be increased even if just a single block, representing only a small part of the scene has moved enough to need the longest available motion vector. Alternatively, the length of motion for the sample image frame may be determined as the longest motion vector length that at least a predetermined number of blocks have been encoded with. Thus, if only one or a few blocks have been encoded with a motion vector that corresponds to the maximum of the motion vector search range, this will not lead to a decision to increase frame rate, but if, for instance, 10% of the blocks have been encoded with such long motion vectors, then that length will be considered the length of motion for the sample image frame. In this manner, a few blocks will be allowed to be encoded as I-blocks, thereby possibly saving bits by not adding the additional image frame. It would also be possible to use an average or a median of all motion vectors in the sample image frame as the length of motion for that sample image frame. Regardless of the approach used for determining the length of motion, each motion vector may have a length in an x direction as well as a length in a y direction. Depending on how the motion vectors are encoded, it may be interesting to study not just the total length of each motion vector, but also the length of the x and y components respectively.

It may be noted that with the above-described approach, it is not possible to find motion vectors that are longer than those fitting within the motion vector search range. However, by downscaling the sample image frame and its reference frame, the motion vector search range may effectively cover a larger portion of the original image frames, such that longer motion vectors can be found. In this manner, it is possible to determine not only that some motion vectors are at the limit of the motion vector search range, but also that some motion vectors are even longer. How long the motion vectors that can be found are depends on with what factor the sample image frame and the reference image frame are downscaled. By downscaling the image frames before the motion vector search, it may also be possible to determine not only that the frame rate should be increased, but also by how much. If, for instance, the downscaling enables finding motion vectors that are actually three times longer than what could have been found in the full scale image, then if the longest motion vectors are twice the motion length threshold, frame rate should be doubled by adding one additional image frame per image frame in the adjustment portion, and if the longest motion vectors are three times the motion length threshold, the frame rate should be tripled by adding two additional image frames per image frame in the adjustment portion.

Another way of determining the length of motion for the sample image frame is to use input from a PTZ controller of the camera. The PTZ controller controls pan and tilt movements of the camera and also controls zooming. Although zooming does not entail actual movement of the camera, in the images captured by the camera, the zooming will have an effect equivalent to movement of the camera. The input from the PTZ controller may indicate how many pixel blocks the movement corresponds to. Alternatively, the PTZ input may tell, e.g., how many degrees the camera field of view has moved, and then this information may be translated into a number of pixel blocks. A PTZ movement often involves movement in an x direction and a y direction, as well as a rotation. A weighted average of these movements may be calculated, and the weighted global length of motion for the sample image frame may be compared to the motion length threshold. If the length of motion is above the motion length threshold, the frame rate of the adjustment portion is increased.

Further, the length of motion for the sample image frame may be determined using a motion sensor in the camera. The motion sensor may, for instance, be an accelerometer or a gyroscope. This approach also provides a global length of motion for the sample image frame, and this length of motion is compared to the motion length threshold for determining if frame rate should be increased.

Regardless of which approach is used, the bitrate saving that may be made by reducing the number of I-blocks in P-frames has to be weighed against the bitrate increase caused by adding additional image frames.

Generally, an estimate may be made of the bit cost for encoding a motion vector, for encoding a P-block, and for encoding an I-block. As a simplified example, the number of bits required for encoding a motion vector is proportional to log 2 of the length of the motion vector. If many blocks have synchronized motion vectors, the bit cost is lower. The number of bits required for encoding a P-block may, for example, be estimated at 20 bits, and an I-block at 200 bits. An overhead cost for a frame may also be estimated and divided by the number of blocks in the image frames, e.g., 0.1 bit per block.

Bitrate may be saved in situations where motion from the first image frame 10 to the second image frame 20 is above the maximum motion vector length, but where encoding of additional image frames reduces motion from one image frame to the next to below the maximum motion vector length. If, for instance, motion from the first image frame 10 to the second image frame 20 is twice as long as the maximum motion vector length, encoding of an additional image frame 30 between the first and second image frames reduces the motion to the maximum motion vector length between the first image frame 10 and the additional image frame 30 and the same between the additional image frame 30 and the second image frame 20. With the exemplifying numbers given above, this may give a saving of the bit cost of an I-block minus two times the cost of a P-block, i.e. 200−2*20=160 bits. The probability of this saving may be denoted p0 and is calculated per block of pixels.

There are also situations in which increasing frame rate would give a loss bitrate-wise. One of these is when there is an oscillating motion back and forth between the first image frame and the second image frame, because then the oscillating object may be at a maximum displacement from its original position at a point in time between the first and second image frames, corresponding to the additional image frame, whereas it may have returned to its original position in the second image frame. The probability of this loss may be denoted p1.

Another of the loss situations is when there is an accelerating movement. The motion from the first image frame to an additional image frame may be below the maximum motion vector length, but with the increasing speed, the motion from the additional image frame to the second image frame may be too large, such that blocks in the second image frame may need to be encoded as I-blocks anyway, such that the additional image frame did not help, but just added bits. The probability of this loss may be denoted p2.

Similarly, a loss may be made when there is a decelerating movement. In such situations, the motion from the first image frame to an additional image frame may be more than half the maximum motion vector length, indicating that without the additional image frame motion from the first image frame to the second image frame would be above the maximum motion vector length. However, with deceleration, the motion from the additional image frame to the second image frame may be small enough that the total motion from the first image frame to the second image frame is below the maximum motion vector length. The probability of this loss may be denoted p3.

Taking the probabilities p0, p1, p2, and p3 into account, it is possible to calculate a saving per block of pixels. If this saving is higher than the overhead cost, then frame rate should be increased.

In a manner similar to when frame rate is increased, there are instances when there is little or no motion in the scene where it would be beneficial bitrate-wise to decrease frame rate. A frame rate decrease is usually expected to decrease output bit rate from the encoder, but as can be understood from the discussion above, this is not always the case. If there is some movement in the scene, and frame rate is decreased, the number of pixel blocks that have to be coded using intra-coding may increase, because the displacement of blocks from one frame to the next is larger than the longest motion vector fitting within the motion vector search range. The same principles as described above may be used for determining when frame rate may be safely decreased. A length of motion for the sample image frame is determined. As already described, this may be done in a number of different ways. The length of motion is compared to the motion length threshold, and if the length of motion is below the motion length threshold, or below the motion length threshold by a predetermined margin, a decision may be made to decrease frame rate, or in other words increase temporal frame distance. This may be done by removing one or more image frames from the adjustment portion of the video sequence. It may also be done by refraining from encoding one or more image frames in a temporally later encoded portion of the video sequence.

Figure 9:
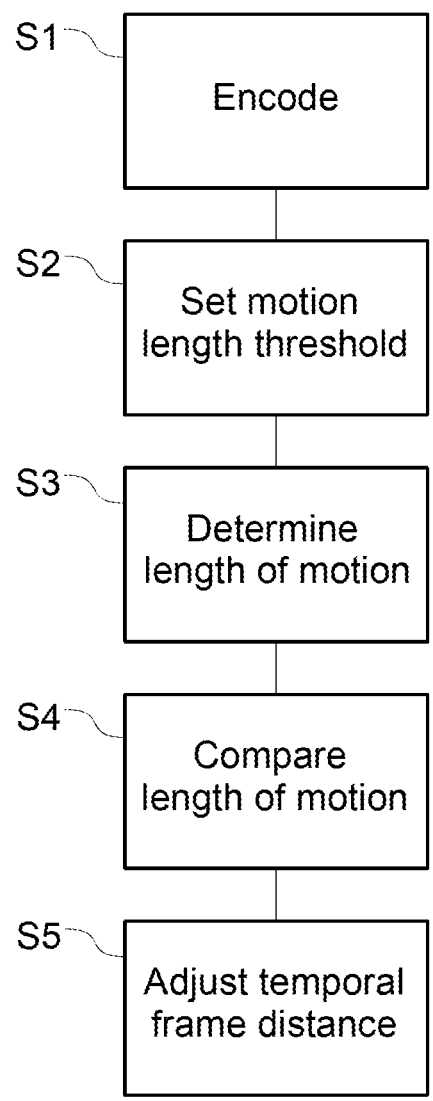
FIG. 9 is a flow chart of a variant of the inventive method.

The principles of the present teachings will now be summarized with the help of an example illustrated in FIG. 9.

Figure 11:
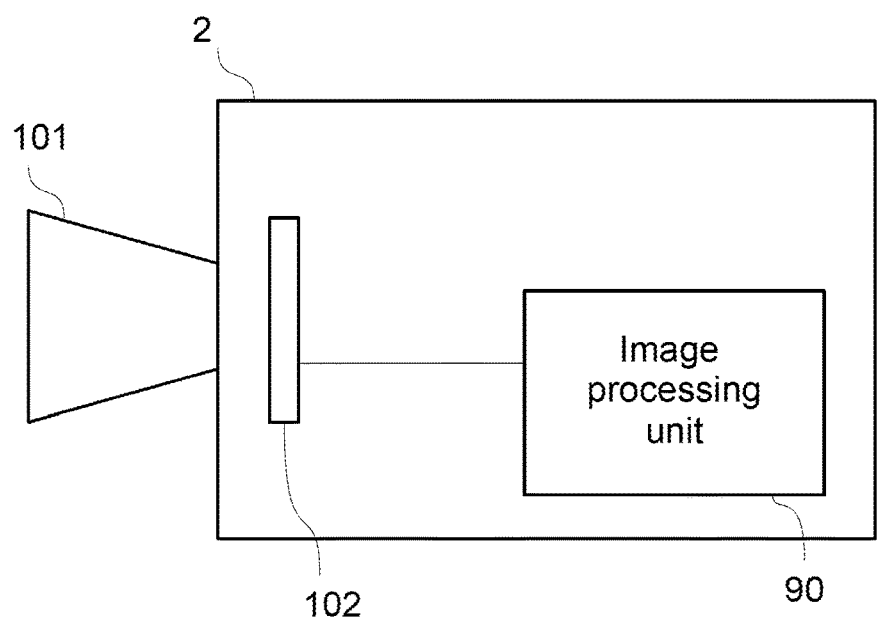
FIG. 11 is a block diagram of a camera according to an embodiment.

Images are captured by a camera, such as the camera 2 in FIG. 1. The camera 2 is also shown in FIG. 11, which will be discussed further below. The images are encoded (step S1 in FIG. 9) in an encoder, thereby forming an encoded portion of a video stream. A motion length threshold is set (S2) based on a motion vector search range of the encoder. As mentioned above, the motion vector search range is often set as an area having a width of a number of pixel blocks and a height of a number of pixel blocks. In some encoders, the motion vector search is instead limited by a maximum search time. A length of motion is determined (S3) for a sample image frame. The sample image frame is one of the encoded image frames in the encoded portion of the video stream. As discussed above, the determination of the length of motion may be done in various ways. The length of motion for the sample image frame is compared to the motion length threshold (S4), and based on this comparison, the temporal frame distance of an adjustment portion of the video stream is adjusted (S5). If the length of motion is above the motion length threshold, the temporal frame distance is decreased, i.e. the frame rate is increased. If the length of motion is below the motion length threshold, the temporal frame distance may be increased or left unaltered. The adjustment of the temporal frame distance may be performed for an adjustment portion of the video stream made up of a predetermined number of successive image frames. After the adjustment portion, the frame rate, and hence the temporal frame distance, may be returned to what it was before the adjustment. Alternatively, the adjusted frame rate may be maintained until a new comparison of motion length in a later sample image frame and the motion length threshold indicates that a new adjustment is needed or that a return to the original frame rate is advisable.

In some applications, a recipient of the encoded video stream, such as a video management system, may not be capable of adjusting frame rate when displaying or storing the video stream. In such cases, it may be advantageous to encode the additional image frames with a non-display flag. The non-display flag will inform the decoder on the receiving end that the additional image frames should not be displayed, but only used for decoding. The displayed image frames will therefore retain the original frame rate, even though the frame rate of the encoder (and the decoder) has been increased.

If the additional image frames are not to be displayed, a further bitrate saving may be achieved by encoding the additional image frames with motion vectors, but without residuals. In this way, the decoder will use the motion vectors of the additional image frames for tracing back to the reference blocks in the nearest preceding reference frame not having a non-display flag, and the encoded residual will be the residual compared to that reference frame, and not to the additional images there between.

Figure 10:
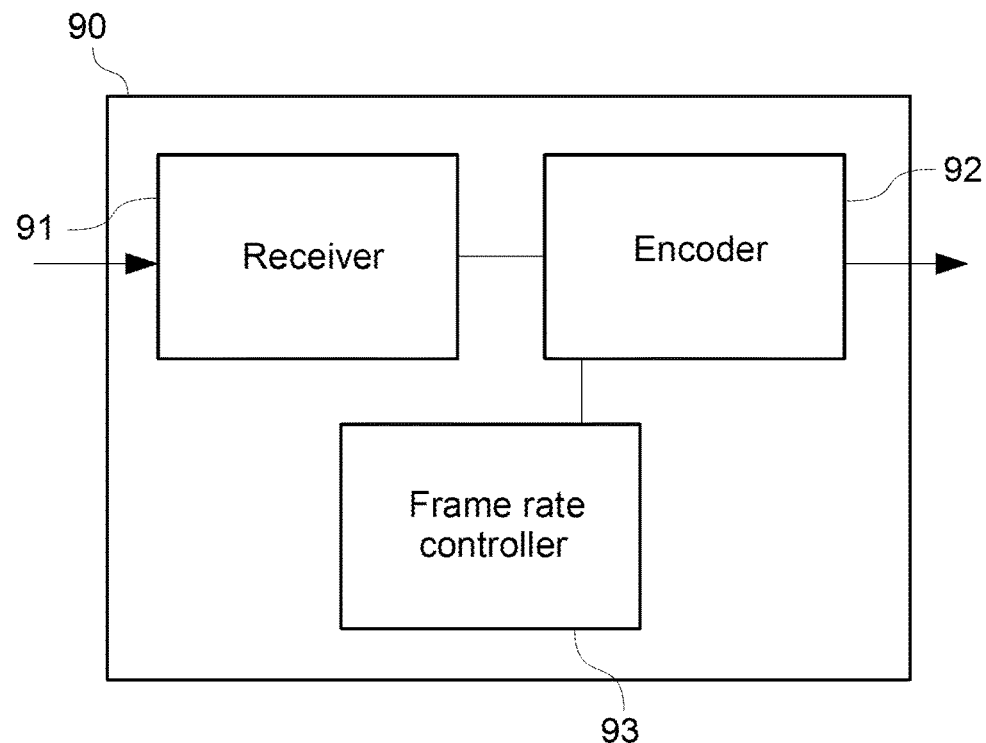
FIG. 10 is a block diagram of a video processing unit according to an embodiment.

In FIG. 10, a block diagram of an example of an image processing unit 90 configured to form a video stream is shown. The image processing unit 90 may work in accordance with the method described above. The image processing unit 90 has a receiver 91 which is arranged to receive images captured by the camera 2. Further, the image processing unit 90 has an encoder 92 which is arranged to encode image frames, based on the received images, for forming an encoded portion of the video stream. The image processing unit 90 also has a frame rate controller 93. The frame rate controller 93 is arranged to determine a length of motion of a sample image frame, which is one of the encoded image frames in the encoded portion of the video stream. As already described above, the length of motion is indicative of the amount of relative motion between the camera and the scene in the sample image frame relative a temporally preceding image frame. The frame rate controller 93 is configured to set a motion length threshold based on a motion vector search range of the encoder. Further, the frame rate controller is configured to compare the determined length of motion with the set motion length threshold, and based on the outcome of the comparison, adjust a chosen temporal frame distance of at least an adjustment portion of the video stream. In other words, based on the comparison of the length of motion and the motion length threshold, the frame rate may be adjusted. As described above, the adjustment portion is comprised in the encoded portion of the video stream or in a temporally later encoded portion of the video stream. The image processing unit 90 may be embodied in software, firmware, or hardware, or any combination thereof.

The image processing unit 90 may be integrated in a camera, such as the camera 2 shown in FIG. 1 and also in FIG. 11. The camera 2 has a lens 101 and an image sensor 102 for capturing images. As the skilled person understands, the camera 2 has other components as well, apart from those shown in FIG. 11. However, as those other components are not necessary for describing the present teachings, they have not been shown in FIG. 11 and will not be discussed further.

The image processing unit 90 may be a self-contained unit in the camera 2 or it may be made up of different components of the camera 2. For instance, the camera 2 may have a central processing unit that performs some of the functions of the image processing unit 90 and that also performs other functions, such as noise filtering, white balancing and distortion correction.

It will be appreciated that a person skilled in the art can modify the above described embodiments in many ways and still use the advantages of the present teachings as shown in the embodiments above. As an example, in the description above, the frame rate is doubled when the length of motion for the sample image frame is above the motion length threshold, i.e. one additional image frame is added between each pair of successive image frames. However, it is possible to add more than one additional image frame. Generally, no more than ten additional image frames will be added.

It should be noted that as long as images are captured at a higher frame rate than they are encoded, it is possible to add additional image frames.

The decision to adjust the temporal frame distance, or in other words the frame rate of the encoder, may be reactive. This will generally be the case when motion is caused by actual movement in the scene or when the camera is shaking. However, the adjustment may also be proactive if the motion is known beforehand. This may be the case for PTZ movements, and more particularly for so called guard tours. A guard tour is a pre-programmed movement of the camera. It may involve visiting a number of preset positions in the space around the PTZ camera and moving on to the next preset position after a specified time or a specified number of frames. In this manner, it is known when movement (or zooming) of the camera will start, and when it will stop. It may also be known how fast the movement or zooming will be. With this pre-knowledge, adjustment of the temporal frame distance or frame rate may be planned ahead.

In the examples above, the adjustment of the temporal frame distance has been made by encoding one additional image frame between successive image frames in the adjustment portion of the video stream. However, as already hinted at, it may sometimes be beneficial to add more additional image frames. As long as the encoding frame rate of the encoder is lower than the frame rate at which images are captured, it is possible to encode additional image frames for adjusting the temporal frame distance, provided that the encoder is capable of operating at that increased frame rate. It is foreseen that the temporal frame rate may often be halved or divided by three by addition of one or two additional image frames, respectively, thus doubling or tripling the frame rate of the adjustment portion of the video stream. Thus, in more general terms, the temporal frame distance may be adjusted by encoding N≥1 additional image frames between successive image frames in the adjustment portion of the video stream. The number of additional image frames will usually be no higher than N=10. N may be changed dynamically and may be based on the estimation of bit cost discussed earlier.

It should be understood that at some point, it does not make sense to increase frame rate, even though there is motion in the scene. For instance, if the motion is so fast that frame rate cannot be increased enough that all blocks with movement can be encoded as P-blocks, it may be wiser to maintain a lower frame rate and encode some blocks as I-blocks. An upper motion length threshold may be set, e.g., as N times the motion length threshold or IN times the motion length threshold. If the length of motion is above the upper motion length threshold, it may be decided that no adjustment of the temporal frame distance should be made, and if the length of motion is below the upper motion length threshold, it may be decided that the temporal frame distance should be adjusted, e.g., by encoding one or more additional image frames if the length of motion is above the motion length threshold, or by removing frames if the length of motion is below the motion length threshold.

Above, the image processing unit has been described as being integrated in a camera, but it may as well be arranged as a separate unit and be operatively connected to a camera.

The images received by the image processing unit may be received directly from the capturing camera, or they may have been captured earlier and stored before they are transmitted to the image processing unit. Thus, the immediate source of the images may be an image sensor or a data file.

In the examples above, a PTZ camera has been mentioned. It should be understood that the present teachings are also useful with cameras capable of panning and tilting, but not zooming. Such cameras may be referred to as PT cameras. A PT camera may be made up of a fixed camera arranged on a so called PT head, which gives the camera panning and tilting capability. Further, the present teachings are also relevant with fixed cameras capable of zooming, as well as with fixed cameras incapable of zooming, i.e. fixed focal length cameras.

The camera may be any kind of camera, such as a camera employing visible light, a camera employing NIR (near infrared) radiation, or a thermal camera.

The camera is advantageously a digital camera, but it may instead be an analogue camera connected to a digitalization unit.

The present teachings have been described in the context of monitoring cameras, sometimes referred to as surveillance cameras, but it may be used to advantage also in other camera applications.

The encoder may operate in accordance with any encoding standard employing motion estimation and motion compensation. The encoder may, for instance be a block-based hybrid encoder, such as a H.264, H.265, or VP9 encoder.

The inventive method may be performed by executing instructions stored on a computer-readable, non-transitory storage medium. The instructions may be executed by any device having processing capability, such as a central processing unit (CPU), a graphics processing unit (GPU), a custom made processing device implemented in an integrated circuit, an ASIC, an FPGA, or logical circuitry including discrete components.

Thus, the present teachings should not be limited to the shown embodiments but should only be defined by the appended claims.

What is claimed is:

1. A method for forming a video stream based on images of a scene captured by a camera, the method comprising:
   encoding, by an encoder, image frames based on images captured by the camera to form an encoded portion of the video stream;
   determining a length of motion for a sample image frame, the sample image frame being one of the encoded image frames in the encoded portion, the length of motion being indicative of the amount of relative motion between the camera and the scene in the sample image frame relative to a temporally preceding image frame, wherein the length of motion for the sample image frame is the longest motion vector that at least a predetermined number of blocks have been encoded with;
   setting a motion length threshold to be the longest length of motion for a block of pixels in the sample image frame that can be detected within a motion vector search range of the encoder;
   comparing the determined length of motion for the sample image frame with the set motion length threshold; and
   based on the outcome of the comparison, adjusting a chosen temporal frame distance of at least an adjustment portion of the video stream, wherein the adjustment portion is located between the sample image frame and a preceding image frame, wherein the adjustment portion is comprised in the encoded portion or in a temporally later encoded portion, wherein adjusting the chosen temporal frame distance comprises decreasing the chosen temporal frame distance of the adjustment portion by encoding one or more additional image frames in response to the determined length of motion being above the set motion length threshold, wherein the encoding the one or more additional frames increases the ratio of blocks of pixels encoded as P-blocks to I-blocks in the encoded images, wherein the one or more additional image frames are located in between successive image frames of the adjustment portion.

2. The method according to claim 1, wherein the one or more additional image frames are inter frame encoded with motion vectors and without residuals.

3. The method according to claim 1, wherein the one or more additional image frames are associated with a non-display marker indicating that the one or more additional image frames are not to be displayed by a receiver of the video stream, and wherein the one or more additional image frames are encoded with motion vectors and without residuals.

4. The method according to claim 1, wherein the adjusting the temporal frame distance comprises:
upon the determined length of motion being below the set motion length threshold, increasing the chosen temporal frame distance of the adjustment portion by removing an encoded image frame of the video stream.

5. The method according to claim 1, further comprising:
comparing the determined length of motion with an upper motion length threshold; and
adjusting the chosen temporal frame distance on a condition that the determined length of motion is below the upper motion length threshold.

6. The method according to claim 1, wherein the determining a length of motion of the sample image frame in the encoded portion comprises:
comparing the sample image frame with a temporally preceding image frame.

7. The method according to claim 6, further comprising, before the comparing, scaling down the sample image frame and the preceding image frame.

8. The method according to claim 1, further comprising:
receiving data indicative of a motion of the camera,
wherein the determining a length of motion of the sample image frame is based on the received data.

9. The method according to claim 8, wherein the data indicative of motion is received from a motion sensor or a pan-tilt-zoom, PTZ, control unit of the camera, wherein the data indicative of motion is received before movement of the camera and is used to adjust the chosen temporal frame distance.

10. A non-transitory computer-readable medium storing instructions which, when executed by a computing device having a processing capability, cause the computing device to execute instructions for forming a video stream based on images of a scene captured by a camera, the instructions causing the computing device to perform operations comprising:
encoding, by an encoder, image frames based on images captured by the camera to form an encoded portion of the video stream;
determining a length of motion for a sample image frame, being one of the encoded image frames in the encoded portion, the length of motion being indicative of the amount of relative motion between the camera and the scene in the sample image frame relative to a temporally preceding image frame, wherein the length of motion for the sample image frame is the longest motion vector that at least a predetermined number of blocks have been encoded with;
setting a motion length threshold to be the longest length of motion for a block of pixels in the sample image frame that can be detected within a motion vector search range of the encoder;
comparing the determined length of motion for the sample image frame with the set motion length threshold; and
based on the outcome of the comparison, adjusting a chosen temporal frame distance of at least an adjustment portion of the video stream, wherein the adjustment portion is located between the sample image frame and a preceding image frame, wherein the adjustment portion is comprised in the encoded portion or in a temporally later encoded portion, wherein adjusting the chosen temporal frame distance comprises decreasing the chosen temporal frame distance of the adjustment portion by encoding one or more additional image frames in response to the determined length of motion being above the set motion length threshold, wherein the encoding the one or more additional frames increases the ratio of blocks of pixels encoded as P-blocks to I-blocks in the encoded images, wherein the one or more additional image frames are located in between successive image frames of the adjustment portion.

11. A processor configured to form a video stream, the processor comprising:
a receiver arranged to receive images of a scene captured by an image sensor;
an encoder configured to encode image frames, based on the received images to form an encoded portion of the video stream; and
a frame rate controller configured to:
determine a length of motion of a sample image frame, being one of the encoded image frames in the encoded portion, the length of motion being indicative of the amount of relative motion between the camera and the scene in the sample image frame relative a temporally preceding image frame, wherein the length of motion for the sample image frame is the longest motion vector that at least a predetermined number of blocks have been encoded with;
set a motion length threshold to be the longest length of motion for a block of pixels in the sample image frame that can be detected within a motion vector search range of the encoder;
compare the determined length of motion for the sample image frame with the set motion length threshold; and
based on the outcome of the comparison, adjust a chosen temporal frame distance of at least an adjustment portion of the video stream, wherein the adjustment portion is located between the sample image frame and a preceding image frame, wherein the adjustment portion is comprised in the encoded portion or in a temporally later encoded portion, wherein adjusting the chosen temporal frame distance comprises decreasing the chosen temporal frame distance of the adjustment portion by encoding one or more additional image frames in response to the determined length of motion being above the set motion length threshold, wherein the encoding the one or more additional frames increases the ratio of blocks of pixels encoded as P-blocks to I-blocks in the encoded images, wherein the one or more additional image frames are located in between successive image frames of the adjustment portion.

12. A camera comprising:
an image sensor configured to capture images; and an image processing unit comprising:
- a receiver arranged to receive images of a scene captured by the image sensor;
- an encoder configured to encode image frames, based on the received images to form an encoded portion of the video stream; and
- a frame rate controller configured to:
  - determine a length of motion of a sample image frame, being one of the encoded image frames in the encoded portion, the length of motion being indicative of the amount of relative motion between the camera and the scene in the sample image frame relative a temporally preceding image frame, wherein the length of motion for the sample image frame is the longest motion vector that at least a predetermined number of blocks have been encoded with;
  - set a motion length threshold to be the longest length of motion for a block of pixels in the sample image frame that can be detected within a motion vector search range of the encoder;
  - compare the determined length of motion for the sample image frame with the set motion length threshold; and
  - based on the outcome of the comparison, adjust a chosen temporal frame distance of at least an adjustment portion of the video stream, wherein the adjustment portion is located between the sample image frame and a preceding image frame, wherein the adjustment portion is comprised in the encoded portion or in a temporally later encoded portion, wherein adjusting the chosen temporal frame distance comprises decreasing the chosen temporal frame distance of the adjustment portion by encoding one or more additional image frames in response to the determined length of motion being above the set motion length threshold, wherein the encoding the one or more additional frames increases the ratio of blocks of pixels encoded as P-blocks to I-blocks in the encoded images, wherein the one or more additional image frames are located in between successive image frames of the adjustment portion.

\* \* \* \* \*